United States Patent [19]

Van Steenwyk et al.

[11] 4,192,077
[45] Mar. 11, 1980

[54] SURVEY APPARATUS AND METHOD EMPLOYING RATE-OF-TURN AND FREE GYROSCOPES

[75] Inventors: Donald H. Van Steenwyk, San Marino; John R. Cash; Paul W. Ott, both of Pasadena, all of Calif.

[73] Assignee: Applied Technologies Associates, San Marino, Calif.

[21] Appl. No.: 925,307

[22] Filed: Jul. 17, 1978

[51] Int. Cl.² .................. E21B 47/024; G01C 19/00
[52] U.S. Cl. ........................................ 33/313; 33/323
[58] Field of Search ............... 33/304, 312, 313, 323, 33/324

[56] References Cited

U.S. PATENT DOCUMENTS

| | | | |
|---|---|---|---|
| 2,309,905 | 2/1943 | Irwin et al. | 33/312 |
| 3,753,296 | 8/1973 | Van Steenwyk | 33/324 |

*Primary Examiner*—Steven L. Stephan
*Attorney, Agent, or Firm*—William W. Haefliger

[57] ABSTRACT

Survey apparatus and method employs a free gyroscope for fast determination of azimuth, free gyroscope alignment being periodically corrected by a rate gyroscope which is periodically rotated for accurate azimuth determination. An accelerometer is also usable in conjunction with the gyroscopes for tilt determination.

18 Claims, 10 Drawing Figures

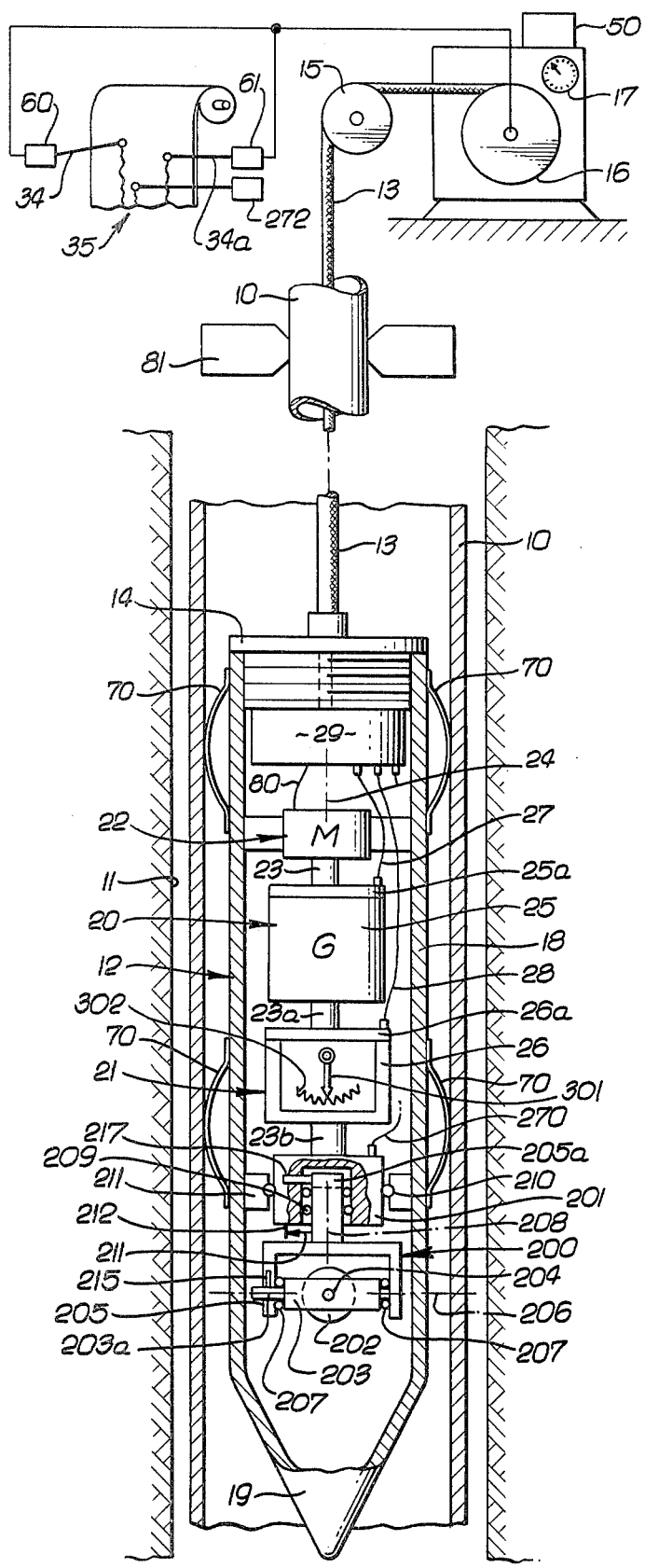

SURVEY APPARATUS AND METHOD EMPLOYING RATE-OF-TURN AND FREE GYROSCOPES

BACKGROUND OF THE INVENTION

This invention relates generally to bore-hole and well mapping, and more particularly concerns method and apparatus to remotely determine the azimuthal direction of a probe, which may for example be inserted into a bore-hole or well. In addition, it concerns method and apparatus to determine the probe's degree of tilt from vertical and to relate the latter to gyroscope generated azimuth information. Further, the azimuth determining apparatus by itself or in combination with the tilt measuring apparatus, may be housed in a carrier of sufficiently small diameter to permit insertion directly into available small I.D. drill tubing, thus eliminating the need to remove the tubing to enable such mapping.

In the past, the task of position mapping a well or bore-hole for azimuth in addition to tilt has been excessively complicated, very expensive, and often inaccurate because of the difficulty in accommodating the size and special requirements of the available instrumentation. For example, magnetic compass devices typically require that the drill tubing be pulled from the hole and fitted with a length of non-magnetic tubing close to the drill head; or, the drill stem may be fitted with a few tubular sections of non-magnetic material, either initially or when drill bits are changed. The magnetic compass device is inserted within this non-magnetic section and the entire drill stem reassembled and run back in the hole as measurements are made. Thereafter, the magnetic compass instrumentation package must again be removed, requiring another round trip of the drill string. These devices are very inaccurate where drilling goes through magnetic materials, and are unusable where casing has been installed.

Directional or free gyroscopes are deployed much as the magnetic compass devices and function by attempting to remember a pre-set direction in space as they are run in the hole. Their ability to remember degrades with time and environmental exposure. Also, their accuracy is reduced as instrument size is reduced, as for example becomes necessary for small well bores. Further, the range of tilt and azimuthal variations over which they can be used is restricted by gimbal freedom which must be limited to prevent gimbal lock and consequent gyro tumbling.

A major advance toward overcoming these problems is described in my U.S. Pat. No. 3,753,296. That invention provides a method and means for overcoming the above complications, problems, and limitations by employing that kind and principal of a gyroscope known as rate-of-turn gyroscope, or commonly 'a rate gyro', to remotely determine a plane containing the earth's spin axis (azimuth) while inserted in a bore hole or well. The rate gyroscope has a rotor defining a spin axis; and means to support the gyroscope for travel in a bore-hole and to rotate about another axis extending in the direction of the hole, the gyroscope characterized as producing an output which varies as a function of azimuth orientation of the gyroscope relative to the earth's spin axis. Such means typically includes a carrier containing the gyroscope and a motor, the carrier being sized for travel in the well, as for example within the drill tubing. Also, circuitry is operatively connected with the motor and carrier to produce an output signal indicating azimuthal orientation of the rotating gyroscope relative to the carrier, whereby that signal and the gyroscope output may be processed to determine azimuth orientation of the carrier and any other instrument therein relative to the earth's spin axis, such instrument for example comprising a well logging device such as a radiometer, inclinometer, etc.

While highly accurate azimuth information is obtainable from the device and method of U.S. Pat. No. 3,753,296, the described procedure is time consuming. For example, lowering of a probe or survey instrumentation in a bore-hole must be arrested while rotation is carried out; and up to several minutes of rotation may be required for each "stop" in the hole. Generally, a survey should stop each 100 to 200 feet, and sometimes as often as 25 to 50 feet in high deviation angle portions of the hole. Further, the need for defining errors introduced by mass unbalance results in the need for more data at each stop. Accordingly, it is clear that faster surveys are highly desirable.

SUMMARY OF THE INVENTION

It is a major object of the invention to provide method and means enabling much faster surveys while employing the benefits of rate-of-turn gyroscopes operating to accurately determine azimuth information. Basically, this is achieved by utilizing a free gyroscope in conjunction with a rate-of-turn gyroscope in the probe of survey instrumentation, and in the manner to be described.

As will appear, the basic method of the invention involves the steps:

(a) operating the free gyroscope to produce an output indicative of azimuth orientation of the instrumentation, and (b) operating the rate-of-turn gyroscope to produce an output which is indicative of azimuth orientation of the instrumentation, and (c) periodically using the output of the rate-of-turn gyroscope to align the free gyroscope.

The method enables azimuth data production by the free gyroscope during travel of the instrumentation in a well or other zone, and periodic interruption of such travel (say at 1,000–2,000 foot intervals) to enable operation of the rate-of-turn gyroscope for purposes of aligning the free gyroscope. Accordingly, much faster surveying of a given length bore-hole is enabled.

In its apparatus aspects the invention basically includes:

(a) a rate of turn gyroscope including a first rotor having a spin axis, (b) means to support the gyroscope for lengthwise travel along another axis generally normal to said spin axis, and to rotate about said other axis, (c) said gyroscope having means for producing an output which varies as a function of azimuth orientation of the gyroscope relative to the earth's spin axis, and (d) a free gyroscope operatively carried for movement along said other axis with said rate-of-turn gyroscope, said free gyroscope including a second rotor having a spin axis, (e) said free gyroscope also having means for producing an output which varies as a function of azimuth orientation of the free gyroscope.

As will appear, both gyroscopes may be carried in a housing relative to which the rate-of-turn gyroscope is rotatable as by a motor; and the free gyroscope may be suspended for rotation by the motor, or it may be separately carried in the housing free of the motor.

As will appear, the combination of a free gyro and a rate gyroscope in accordance with the invention realizes the distinct advantages of each (continued accuracy of the rate gyro, and survey speed of the free gyro) to achieve a result which is greater than the sum of the two gyros, considered independently. For example, in the event of a power interruption, a tumbled free gyroscope can be reoriented by use of rate gyro output data, obviating any need to bring the free gyro back to the well or hole surface for realignment. Such return trips are very expensive in the case of oil and gas wells. In addition, it now becomes possible to map or survey bore holes characterized by high deviations, using free gyroscopes which previously could not be utilized for this purpose, periodic reorientation through employment of rate gyro output making this feasible.

These and other objects and advantages of the invention, as well as the details of an illustrative embodiment, will be more fully understood from the following description and drawings, in which:

DRAWING DESCRIPTION

FIG. 1 is an elevation taken in section to show use of the instrument of the invention, in well mapping;

FIG. 1a is a plan view of a pick-off;

FIG. 1b is a block diagram;

FIG. 2 is a diagram indicating tilt of the well mapping instrument in a slanted well;

FIG. 3 is a wave form diagram;

DETAILED DESCRIPTION

Figure 4:
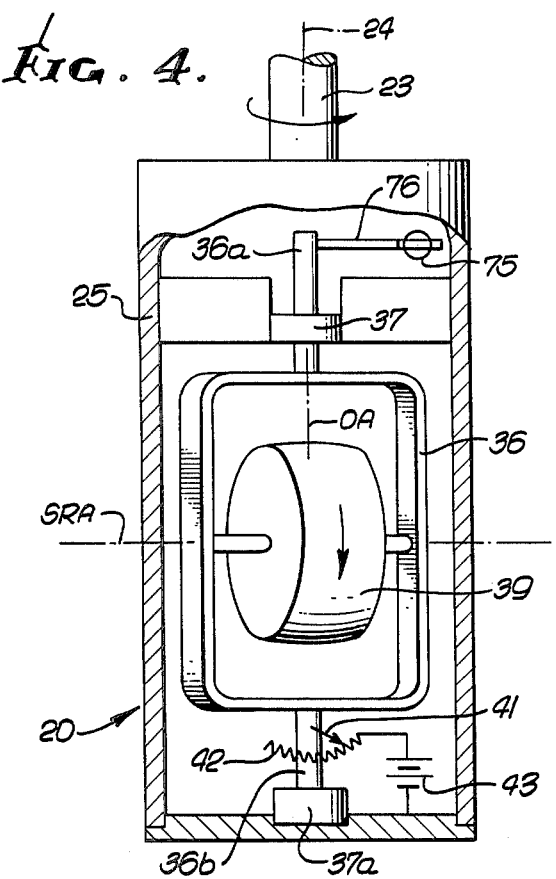
FIGS. 4 and 4a are schematic showings of a single degree of freedom gyroscope as may be used in the apparatus of FIG. 1.

In FIG. 1, well tubing 10 extends downwardly in a well 11, which may or may not be cased. Extending within the tubing is a well mapping instrument or apparatus 12 for determining the direction of tilt, from vertical, of the well or bore-hole. Such apparatus may readily be traveled up and down in the well, as by lifting and lowering of a cable 13 attached to the top 14 of the instrument. The upper end of the cable is turned at 15 and spooled at 16, where a suitable meter 17 may record the length of cable extending downwardly in the well, for logging purposes.

The apparatus 12 is shown to include a generally vertically elongated tubular housing or carrier 18 of diameter less than that of the tubing bore, so that well fluid in the tubing may readily pass, relatively, the instrument as it is lowered in the tubing. Also, the lower terminal of the housing may be tapered at 19, for assisting downward travel or penetration of the instrument through well liquid in the tubing. The carrier 18 supports a rate gyroscope 20, accelerometer 21, and drive means 22 to rotate the latter, for travel lengthwise in the well. Bowed springs 70 on the carrier center it in the string 10.

The drive means 22 may include an electric motor and speed reducer functioning to rotate a shaft 23 relatively slowly about axis 24 which is generally parallel to the length axis of the tubular carrier, i.e., axis 24 is vertical when the instrument is vertical, and axis 24 is tilted at the same angle from vertical as is the instrument when the latter bears sidewardly against the bore of the tubing 10 when such tubing assumes the same tilt angle due to bore-hole tilt from vertical. Merely as illustrative, the rate of rotation of shaft 23 may be within the range 0.5 RPM to 5 RPM.

Due to rotation of the shaft 23, and a lower extension 23a thereof, the frame 25 of the gyroscope and the frame 26 of the accelerometer are both rotated simultaneously about axis 24, within and relative to the sealed housing 18. The signal outputs of the gyroscope and accelerometer are transmitted via terminals at suitable slip ring structures 25a and 26a, and via cables 27 and 28, to the processing circuitry at 29 within the instrument, such circuitry for example including a suitable amplifier or amplifiers, and multiplexing means, if desired. The multiplexed or non-multiplexed output from such circuitry is transmitted via a lead in cable 13 to a surface recorder, as for example includes pens 34 and 34a of a strip chart recorder 35, whose advancement may be synchronized with the lowering of the instrument in the well. The drivers 60 and 61 for recorder pens 34 and 34a are calibrated to indicate bore-hole azimuth and degree of tilt, respectively the run-out of the strip chart indicating bore-hole depth along its length.

Figure 4A:
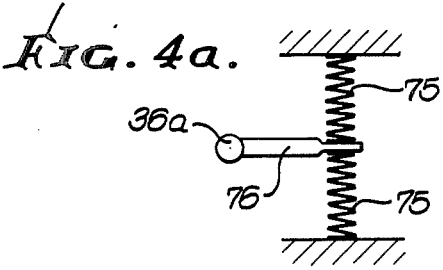

Turning to FIG. 4, the gyroscope 20 is schematically indicated as having its frame 25 rotated about upward axis 24, as previously described. A sub-frame 36 of the gyroscope has shafts 36a and 36b bearing supported at 37 and 37a by the frame 25, to pivot about output axis OA coincident with axis 24. The gyroscope rotor 39 is suitably motor driven to rotate about spin reference axis SRA which is normal to axis OA, and also normal to axis 24. The rotor is carried by sub-frame 36, to pivot therewith and to correspondingly rotate the wiper 41 in engagement with resistance wire 42 connected with DC source 43. The sub-frame 36 is yieldably biased against rotation about axis OA and relative to the housing 25, by compression springs 75 (or their electrical equivalents) carried by the housing and acting upon the arm 76 connected to shaft 36a, as better seen in FIG. 4a.

Accordingly, the current flow via the wiper is a function of pivoting of the sub-frame 36 about axis OA, which is in turn a function of rotary orientation of the frame 25 with respect to a North-South longitudinal plane through the instrument in the well. As seen in FIG. 3, the gyroscope may be rotated about axis 24 so that its signal output 39a is maximized when spin reference axis SRA passes through the North-South longitudinal plane, and is zero when that axis is normal to that plane. One usable gyroscope is model GI-G6, a product of Northrop Corporation.

The accelerometer 21, which is simultaneously rotated with the gyroscope, has an output as represented for example at 45 under tilted conditions corresponding to tilt of axis 24 in the North-South longitudinal plane; i.e., the accelerometer output is maximized when the gyroscope output indicates South alignment, and again maximized when the gyroscope output indicates North alignment. FIG. 2 shows tilt of axis 24 from vertical 46, and in the North-South plane, for example. Further, the accelerometer maximum output is a function of the degree of such tilt, i.e. is higher when the tilt angle increases, and vice versa; therefore, the combined outputs of the gyroscope and accelerometer enable ascertainment of the azimuthal direction of bore-hole tilt, at any depth measured lengthwise of the bore-hole, and the degree of that tilt. FIG. 1 schematically shows a pick-off for the accelerometer, and including slide wire 302 and wiper 301.

Figure 5:
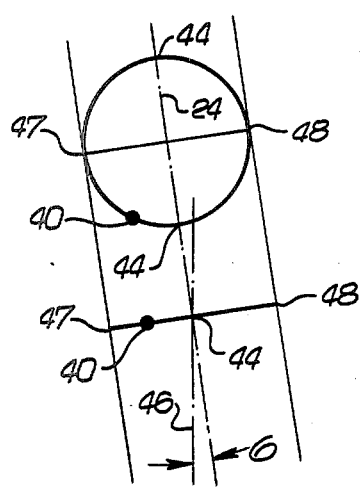
FIG. 5 is a diagrammatic showing of the operation of the inclinometer—accelerometer during instrument tilted conditions.

FIG. 5 diagrammatically illustrates the functioning of the accelerometer in terms of rotation of a mass 40 about axis 24 tilted at angle θ from vertical 46. As the mass rotates through points 44 at the level of the intersection of axis 24 and vertical 24, its rate of change of velocity in a vertical direction is zero; however, as the mass rotates through points 47 and 48 at the lowest and highest levels of its excursion, its rate of change of velocity in a vertical direction is at a maximum, that rate being a function of the tilt angle θ. A suitable accelerometer is that known as Model 4303, a product of Systron-Donner Corporation, of Concord, Calif.

Control of the angular rate of rotation of shaft 23 about axis 24 may be from surface control equipment indicated at 50, and circuitry 29 connected at 80 with the motor. Means (as for example a rotary table 81) to rotate the drill pipe 10 during well mapping, as described, is shown in FIG. 1.

FIG. 1 also illustrates the use of a free gyroscope operatively carried for movement along the axis 24 extending lengthwise of the bore-hole 11, and generally normal to spin reference axis SRA of the rotor 39. The free gyroscope designated at 200 is typically carried by the carrier 18 to be moved with gyroscope 20. More specifically, another lower extension 23b of shaft 23 supports the frame 201 of the free gyroscope for simultaneous rotation with the frame 25 of gyroscope 20 and the frame 26 of inclinometer 21, within and relative to the sealed housing or carrier 18.

The free gyroscope includes a rotor 202 mounted by sub-frame 203 for rotation about lateral axis 204 which is normal to axis 24. Sub-frame 203 is in turn mounted by sub-frame 205 for rotation about lateral axis 206 normal to axis 24, gimbal bearings 207 provided for this purpose. Sub-frame 205 is mounted by frame 201 for rotation about longitudinal axis 208, which is parallel and normally coincident with axis 24, gimbal bearings 209 provided for this purpose. Frame 201 is centered for rotation by the motor 22, as by bearings 210 and cage 211. The gyroscope rotor may be self driven as by a drive motor, not shown.

The free gyroscope also has means for producing an output which varies as a function of azimuth orientation of the free gyroscope, relative to the earth's spin axis. Such means may take the form shown in FIGS. 1 and 1a, and include a pick-off wiper arm 211 carried by the sub-frame 205 for rotation about axis 208, and a resistance wire 212 carried by frame 201 and extending about axis 208 for slide contact with arm 211. Wire 212 is shown in FIG. 1a as connected with DC source 213. The latter may be incorporated within the circuitry container 29. Lead 270 conducts the output from 211 to circuitry 29, as via suitable slip ring structure associated with frame 201. A third recorder pen 272 records that output, or a processed version thereof, on strip chart 35.

The free gyroscope also includes means (either electrical or mechanical) to cage and uncage one set of gimbals at times during which the spin axis of the free gyroscope is re-oriented. One such means is shown to take the form of a solenoid actuated plunger 215 carried by sub-frame 205 to engage and release a detent on shaft 203a of the sub-frame 203, thereby to arrest or allow rotation of that sub-frame about lateral axis 206. The solenoid may be operated to cage gimbals 207 when the sub-frame 205 is to be rotated to re-orient or re-set the azimuth orientation of the spin axis 204, as for example to true North or a predetermined angle from North. A driver for this purpose is schematically indicated at 217 as engaging shaft 205a of sub-frame 205, to rotate the latter about axis 208.

FIG. 1b is a block diagram showing coupling of the free gyro 200 to the rate gyro 20, to a master control 220, and to elements 215 and 217 as described. The rate gyro may then be employed to accurately control re-orientation of the free gyro spin axis, as after degradation of spin axis orientation in a bore-hole for example. Thus, means is provided and coupled to the two gyros so as to be responsive to the rate-of-turn gyroscope output at 20a to effect re-orientation of the free gyroscope spin axis. Such means may be considered to include circuitry 217 that incorporates the driver that drives the free gyro when it is caged, to azimuthally re-orient its spin axis. Control 220, which may be at the surface, is connected with elements 20, 215, 217 and 200 so as to effect operation of cage/uncage means 215 to cage the gyro 200, and then effect operation of driver 217 to re-orient the spin axis of the free gyro, and to then effect operation of means 215 to uncage the free gyro. Devices 215 and 217 are well known, examples being those used in Systron Donner PKF-3, and Electronic Specialty Co., NF 4111.

The free gyroscope may be operated with motor 22 shut off, to provide azimuth information as the tool is lowered or raised in a well or other zone, allowing rapid operation for mapping. At intervals, the rate-of-turn gyroscope may be operated to determine true North, and to re-set or re-orient the free gyroscope, after which the latter is again operated as the tool is raised or lowered. Alternatively, the free gyroscope itself may be operated as a rate-of-turn gyroscope, as by maintaining one of its axes in caged condition, and restraining the second axis to connect it to a rate gyro, and rotating the free gyroscope by use of motor 22, or by rotating the pipe 10. Electronic Specialty Co. gyroscope NF 5018 could be used for this purpose. The leads from control 220 may be incorporated in cable 13, and cables 27 and 270, for example.

Figure 6:
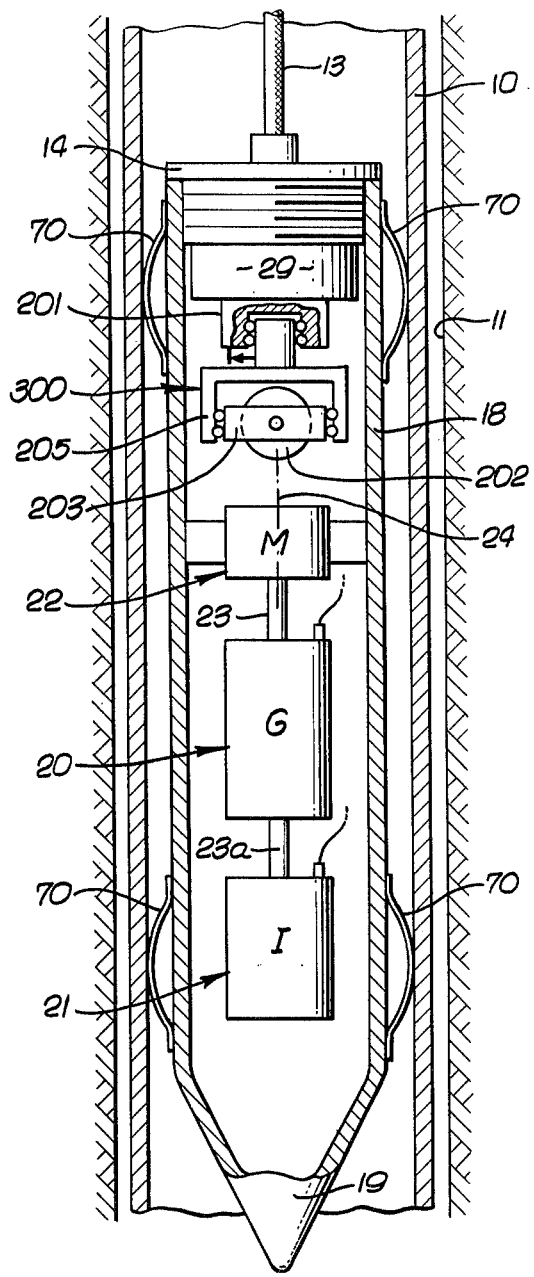
FIG. 6 is a view like FIG. 1 showing a modification.

Referring, now to FIG. 6 the elements 20, 21 and 22 are the same as previously described in FIG. 1. The free gyroscope 300 is generally the same as at 200 in FIG. 1, except that it is not rotatable by motor 22. However, it is carried by and within the housing 18, independently of the rate-of-turn gyroscope. As shown, it is carried directly below the electronics container 29, and above the motor 22. The description of FIG. 1b is also applicable to free gyroscope 300 in relation to elements 220, 20, 20a, 217 and 215 which are also found in FIG. 6. Both free gyroscopes 200 and 300 can take the form of known cageable Model PKF 4, a product of Systron Donner Corporation, Calif.

Figure 7:
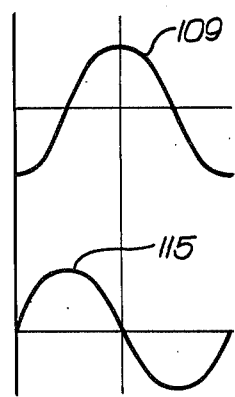
FIG. 7 is a wave form diagram.

Referring to FIGS. 1 and 7, the gyroscope 20 is characterized as producing an output which varies as a function of azimuth orientation of the gyroscope relative to the earth's spin axis. That output is for example indicated at 109 in FIG. 7. Wave form 115 indicates azimuth orientation of the gyroscope relative to the carrier, as described in U.S. Pat. No. 3,753,296, suitable circuitry being provided for that purpose.

I claim:

1. In apparatus for determining azimuth, the combination that comprises 1. 
   (a) a rate-of-turn gyroscope including a first rotor having a spin axis,
   (b) support means to support the gyroscope for lengthwise travel along another axis generally normal to said spin axis, and to rotate about said other axis,
   (c) said gyroscope having first means for producing an output which varies as a function of azimuth orientation of the gyroscope relative to the earth's spin axis, and
   (d) a free gyroscope operatively carried for movement along said other axis with said rate-of-turn gyroscope, said free gyroscope including a second rotor having a spin axis subject to alignment,
   (e) said free gyroscope also having means for producing an output which varies as a function of azimuth orientation of the free gyroscope,
   (f) other means responsive to the output of the rate-of-turn gyroscope to effect said alignment of the free gyroscope spin axis, and
   (g) control means connected with said other means to periodically cause said other means to effect said alignment, while said travel is effectively interrupted.

2. The combination of claim 1 wherein said free gyroscope has a frame carried by said support means to rotate about said other axis.

3. The combination of claim 2 wherein said support means comprises well tubing operable to rotate said rate-of-turn gyroscope about said other axis in response to well tubing rotation.

4. The combination of claim 2 wherein said support means includes a motor operatively connected with said gyroscopes to rotate them about said other axis.

5. The combination of claim 4 wherein said support means includes a housing supporting and containing said motor and said gyroscopes.

6. The combination of claim 4 wherein the rate-of-turn gyroscope includes a carrier frame rotatable by the motor, and a sub-frame, the first rotor carried by the sub-frame, the free gryoscope also carried by the carrier frame.

7. The combination of claim 1 including an inclinometer operatively carried for movement along said other axis with said gyroscopes.

8. The combination of claim 6 including an inclinometer carried by said carrier frame.

9. The combination of claim 1 wherein said support means includes a housing containing said gyroscopes.

10. The combination of claim 7 wherein said inclinometer comprises an accelerometer.

11. The combination of claim 8 wherein said inclinometer comprises an accelerometer.

12. The combination of claim 1 wherein the free gyroscope has two sets of gimbals, and caging means to cage and uncage one set of said gimbals, at times during which the spin axis of the free gyroscope is re-oriented.

13. The combination of claim 1 wherein said other means includes a drive operatively connected between the rate-of-turn gyroscope and the free gyroscope to be responsive to the output of the rate-of-turn gyroscope for periodically re-orienting the spin axis of the free gryoscope.

14. The combination of claim 1 including a housing independently supporting both the free gyroscope and the rate-of-turn gyroscope.

15. The combination of claim 5 including structure suspending said housing for running in a well.

16. In a survey method which employs instrumentation embodying both rate-of-turn and free gyroscopes, the steps that include
   (a) traveling both said gyroscopes together along a travel direction,
   (b) operating the free gyroscope to produce an output indicative of azimuth orientation of the instrumentation, and
   (c) operating the rate-of-turn gyroscope to produce an output which is indicative of azimuth orientation of the instrumentation, and
   (d) periodically using the output of the rate-of-turn gyroscope to align the free gyroscope, while said traveling of both gyroscopes along said direction is substantially interrupted.

17. The method of claim 16 wherein said free gyroscope has a spin axis, and wherein said aligning includes re-orienting the spin axis of the free gyroscope relative to North.

18. The method of claim 16 including the step of caging the free gyroscope during said aligning step.

* * * * *